Aug. 31, 1954     S. A. JOHNSON     2,687,534
CHILDREN'S URINAL
Filed Sept. 7, 1949
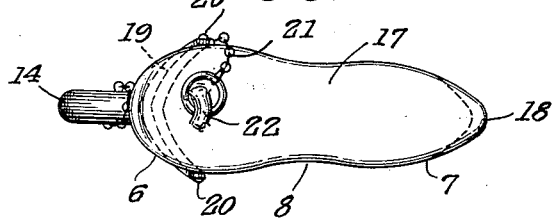
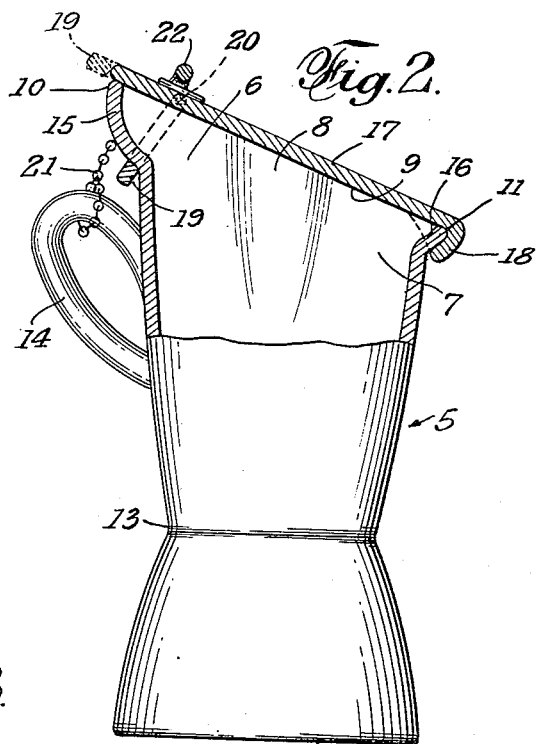
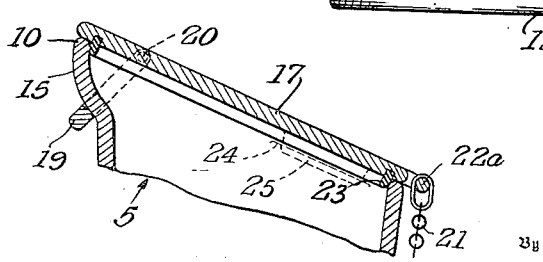
Inventor
SARAH ABERSOLD JOHNSON
C. G. Stratton
Attorney Patented Aug. 31, 1954

2,687,534

UNITED STATES PATENT OFFICE 2,687,534

CHILDREN'S URINAL

Sarah Abersold Johnson, San Gabriel, Calif.

Application September 7, 1949, Serial No. 114,407

2 Claims. (Cl. 4—110)

This invention relates to urinals for both boys and girls although the same is more particularly devised for little girls unable to properly use facilities provided for adults.

An object of the present invention is to provide a portable children's urinal of novel form for convenience of use.

Another object of the invention is to provide a lid-covered urinal of the nature indicated in which said lid is held captive, and simple easily operable means are provided for releasably fastening the lid in place to obviate spillage upon inadvertent upsetting of the urinal.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a top plan view of a children's urinal embodying one form of the present invention.

Fig. 2 is a side elevational view thereof, the upper part being shown in section.

Fig. 3 is a sectional view of the upper portion of another form of urinal.

The body 5 of the urinal is a receptacle formed to have an oval shape in plan, said shape being somewhat modified to have a front bulged part 6, a slightly less bulged rear part 7, and an inwardly pinched part 8 therebetween. The shape is such that the thighs of the user encompass said pinched part 8. The upper open end 9 of the body is sloped from its forward end 10 downward toward its rearward end 11. Thus, the urinal is readily introduced, rear end first, into position for use.

The facade of the body may vary. As shown, the same has a modified hour-glass shape affording a large base 12, a large open end 9, and a constricted intermediate part 13. The latter minimizes sloshing and possible spillage of the contents. For convenience in handling, the front end of the body is provided with a handle 14 of the pitcher-handle type.

At the front, adjacent the open top of the body, the same is formed to have a convexly rounded lip 15 that extends forward of the main front portion of the body. At the rear, a similar smaller lip 16 extends rearward of the rear portion of the body.

The above-described body is provided with a lid or cover 17 that is shaped generally in accordance with the shape of the body top and of sufficient size to overstand the same, as shown.

In the form of the invention shown in Figs. 1 and 2, the rear end or heel of the lid 17 is formed with a socket portion 18 that engages and interlocks with the outer face of lip 16 and, thereby, serves to locate said lid to cover the body opening. At the front end of the lid there is provided a bail member 19 that is hinged to the lid at 20 and arranged to swing across the front of the lid. Said bail is formed to suit the cross-sectional form of lip 15 and to be swung down to engage the same as shown in Fig. 2. The arc on which lip 15 is generated is so disposed that bail 19 first freely moves over the upper part of said lip and then engages a lower portion thereof to thereby both draw the lip 16 and socket 18 together and firmly hold the lid down on the body. Thus the urinal can be firmly closed to escape of odors and also to obviate spillage.

The lid is held captive to the body as by a chain 21 connecting handle 14 and an eye 22 provided on the top face of the lid. A suitable gasket, as taught in Fig. 3, may be provided between the body and the lid.

The form of Fig. 3 shows the above-mentioned gasket at 23. In this variation, the socket 18 of the previous form is omitted and, instead, a slideway comprising cooperating parts 24 and 25 on the body top and lid is provided. Said slideway may be located at opposite sides of the narrower rear portion of the urinal, as shown, or at opposite sides of the wider front portion. In the form shown, the lid is applied with the rear end thereof at about the middle of the top and the lid is then slid rearwardly to engage and interlock parts 24 and 25. The gasket 23, of course, yields wherever necessary and effects a seal when the lid is in place and bail 19 is used, as before, to releasably lock the assembly. The eye 22a, in this instance, may be placed at the rear or at one of the sides of the lid and the chain 21 may hold the lid captive as to any suitable portion of the body 5.

While the invention that has been illustrated and described is now regarded as the preferred embodiment, the constructions are, of course, subject to modifications without departing from the spirit and scope of the invention. It is, therefore, not desired to restrict the invention to the particular forms of construction illustrated and described, but to cover all modifications that may fall within the scope of the appended claims.

Having thus described the invention, what is claimed and desired to be secured by Letters Patent is:

1. A urinal comprising a receptacle having an open top defined by a sloping peripheral edge of said receptacle, the higher end of the receptacle top being provided with a convexly rounded forwardly-extending lip generated on a center immediately above said open top, a similar smaller and oppositely directed lip being provided at the lower end of said receptacle top and opposite to the first mentioned lip, a closure lid for said receptacle and conforming in size and shape to said open top, a socket extending integrally from one end of the lid and separably engageable over the smaller lip in hooking engagement therewith, and a swingable bail member carried by the lid on transverse pivots on the end of the lid opposite to said socket and conforming to the shape of the first-mentioned lip and to the portion of the lid that covers said lip, said bail member being swingable between a position aligned with the lid and a position in hooking engagement with said first-mentioned lip and constituting, in the latter position, a separable connector between the receptacle and lid that cooperates with the smaller lip and the socket therefor to hold the lip removably on the receptacle.

2. A urinal according to claim 1: said socket conforming to the shape of the smaller lip to engage rearward and lateral parts of said lip and, thereby, hold the cover against transverse displacement relative to the receptacle.

References Cited in the file of this patent

UNITED STATES PATENTS

| Number | Name | Date |
|---|---|---|
| 43,499 | Hidden | July 12, 1864 |
| 506,905 | Corwin | Oct. 17, 1893 |
| 683,781 | Moellenbrock | Oct. 1, 1901 |
| 846,783 | Dahl | Mar. 12, 1907 |
| 884,842 | Nelson | Apr. 14, 1908 |
| 1,100,647 | Baumann | June 16, 1914 |
| 1,677,223 | Wittig | July 27, 1928 |

FOREIGN PATENTS

| Number | Country | Date |
|---|---|---|
| 894 | Great Britain | Mar. 6, 1877 |